(12) United States Patent
Kim et al.

(10) Patent No.: US 9,789,867 B2
(45) Date of Patent: Oct. 17, 2017

(54) METHOD FOR LEARNING THE KISSPOINT OF AN ENGINE CLUTCH IN A HYBRID VEHICLE

(71) Applicant: Hyundai Motor Company, Seoul (KR)

(72) Inventors: Sung Deok Kim, Seongnam-si (KR); Sang Joon Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/877,780

(22) Filed: Oct. 7, 2015

(65) Prior Publication Data

US 2016/0193995 A1 Jul. 7, 2016

(30) Foreign Application Priority Data

Jan. 5, 2015 (KR) ........................ 10-2015-0000432

(51) Int. Cl.
*B60W 20/40* (2016.01)
*B60W 10/02* (2006.01)
(Continued)

(52) U.S. Cl.
CPC .............. *B60W 20/40* (2013.01); *B60K 6/46* (2013.01); *B60W 10/02* (2013.01); *B60W 10/06* (2013.01);
(Continued)

(58) Field of Classification Search
CPC ................ B60W 10/02; B60W 10/06; B60W 2550/142; B60W 20/40; B60W 2540/14; B60W 30/18027; B60W 2050/0088; B60W 2510/186; B60W 2540/10; B60W 2050/0087; B60W 2520/10; B60W 2530/14; B60W 30/18118; B60W 30/192; B60W 40/072; B60W 40/076; F16D 48/06; F16D 2500/1066; F16D 2500/70605; F16D 2500/10412; F16D 2500/3026; F16D 2500/30806; F16D 2500/7041; F16D 2500/1026; F16D 2500/1045;
(Continued)

(56) References Cited

U.S. PATENT DOCUMENTS 9,283,957 B2 * 3/2016 Moon .................... B60W 20/40
2006/0106520 A1 * 5/2006 Bodin ..................... B60T 7/122
701/67

(Continued)

FOREIGN PATENT DOCUMENTS

JP 5573747 B2 8/2014
JP 2014-213704 A 11/2014
(Continued)

*Primary Examiner* — Mussa A Shaawat
*Assistant Examiner* — Sanjeev Malhotra
(74) *Attorney, Agent, or Firm* — McDermott Will & Emery LLP

(57) ABSTRACT

The present disclosure provides a method for learning a kisspoint of an engine clutch in a hybrid vehicle, which performs kisspoint learning of an engine clutch while driving by learning hydraulic pressure at the time when motor torque varies by gradually increasing clutch hydraulic pressure in an open state of the engine clutch when a driving load of a vehicle is constant to increase a kisspoint learning frequency of the engine clutch and improve kisspoint accuracy.

6 Claims, 3 Drawing Sheets

(51) Int. Cl.
| | |
|---|---|
| *B60W 10/06* | (2006.01) |
| *B60W 10/08* | (2006.01) |
| *B60W 50/06* | (2006.01) |
| *B60K 6/46* | (2007.10) |
| *B60W 20/15* | (2016.01) |
| *B60W 50/00* | (2006.01) |
| *B60K 6/48* | (2007.10) |

(52) U.S. Cl.
CPC ............ *B60W 10/08* (2013.01); *B60W 20/15* (2016.01); *B60W 50/0098* (2013.01); *B60W 50/06* (2013.01); *B60K 2006/4825* (2013.01); *B60W 2050/0014* (2013.01); *B60W 2050/0086* (2013.01); *B60W 2050/0087* (2013.01); *B60W 2510/081* (2013.01); *B60W 2510/083* (2013.01); *B60W 2510/244* (2013.01); *B60W 2540/10* (2013.01); *B60W 2710/021* (2013.01); *B60W 2710/0644* (2013.01); *B60W 2710/081* (2013.01); *B60W 2710/083* (2013.01); *F16D 2500/50245* (2013.01); *Y02T 10/6286* (2013.01); *Y10S 903/93* (2013.01)

(58) Field of Classification Search
CPC ... F16D 2500/3024; F16D 2500/30421; F16D 2500/3065; F16D 2500/3067; F16D 2500/3144; F16D 2500/50236; F16D 2500/50251; F16D 2500/50825; F16D 2500/70252; F16D 2500/70406; F16D 2500/7044; F16D 48/066; F16D 21/00; F16D 2500/1107; F16D 2500/30406; F16D 2500/30803; F16D 2500/3127; F16D 2500/31413; F16D 2500/50224; F16D 2500/50245; F16D 2500/50266; F16D 2500/50287; F16D 2500/5045; F16D 2500/5102; F16D 2500/5108; F16D 2500/70217; F16D 2500/70264; F16D 2500/7027; F16D 2500/70282; F16D 2500/70448; F16D 2500/70673; F16H 2342/042; F16H 61/688; F16H 2342/044; Y10T 477/78; Y10T 477/75; Y10T 477/753; Y10T 477/6425; Y10T 74/19233; Y10S 903/93
USPC ............ 701/22, 48, 53, 67, 68, 113; 74/333; 477/167, 176; 192/48.1, 48.3, 84.9, 192/85.62, 104 R; 60/605.1; 1/1
See application file for complete search history.

(56) References Cited

U.S. PATENT DOCUMENTS

| | | | |
|---|---|---|---|
| 2008/0109143 A1* | 5/2008 | Bartels | F16H 61/0403 701/67 |
| 2009/0078070 A1* | 3/2009 | Earp | F16H 61/0059 74/333 |
| 2009/0131223 A1* | 5/2009 | Kulbe | H04L 12/5693 477/176 |
| 2010/0179739 A1* | 7/2010 | Desfriches | B60W 40/072 701/68 |
| 2010/0185374 A1* | 7/2010 | Desfriches | B60W 40/072 701/68 |
| 2010/0204890 A1* | 8/2010 | Desfriches | B60T 7/042 701/48 |
| 2010/0282561 A1* | 11/2010 | Rinck | F16H 61/688 192/48.3 |
| 2011/0125378 A1* | 5/2011 | Blessing | F16D 48/06 701/68 |
| 2011/0245036 A1* | 10/2011 | Lochocki, Jr. | B60W 10/02 477/167 |
| 2012/0138413 A1* | 6/2012 | Moorman | F16H 61/2807 192/85.62 |
| 2012/0234004 A1* | 9/2012 | Stoffels | F02D 23/00 60/605.1 |
| 2013/0118857 A1* | 5/2013 | Wittholz | F16D 43/12 192/104 R |
| 2014/0048372 A1* | 2/2014 | Walker | F16D 13/64 192/48.1 |
| 2014/0067174 A1* | 3/2014 | Park | F16H 61/061 701/22 |
| 2014/0172212 A1* | 6/2014 | Park | B60W 20/40 701/22 |
| 2014/0257680 A1* | 9/2014 | Pauli | B60W 50/10 701/113 |
| 2015/0051803 A1* | 2/2015 | Tao | F16D 48/062 701/68 |
| 2015/0088394 A1* | 3/2015 | Hawkins | B60W 10/02 701/67 |
| 2015/0136559 A1* | 5/2015 | Brumberger | F16D 48/064 192/84.9 |
| 2015/0266468 A1* | 9/2015 | Moon | B60W 20/40 701/22 |
| 2015/0369364 A1* | 12/2015 | Vu | F16H 61/688 701/53 |

FOREIGN PATENT DOCUMENTS

| | | |
|---|---|---|
| KR | 10-2013-0131479 A | 12/2013 |
| KR | 10-2013-0136779 A | 12/2013 |
| KR | 10-1371461 B1 | 3/2014 |
| KR | 10-1371482 B1 | 3/2014 |
| KR | 10-1470209 B1 | 12/2014 |

\* cited by examiner

METHOD FOR LEARNING THE KISSPOINT OF AN ENGINE CLUTCH IN A HYBRID VEHICLE

CROSS-REFERENCE TO RELATED APPLICATION

This application claims under 35 U.S.C. §119(a) the benefit of Korean Patent Application No. 10-2015-0000432, filed on Jan. 5, 2015 with the Korean Intellectual Property Office, the entire contents of which are incorporated herein by reference.

TECHNICAL FIELD

The present disclosure relates to a method for learning a kisspoint of an engine clutch in a hybrid vehicle, and more particularly, to a method for learning a kisspoint of an engine clutch in a hybrid vehicle to increase a kisspoint learning frequency of an engine clutch deployed between a engine and a motor of a hybrid vehicle to improve kisspoint accuracy.

BACKGROUND

A hybrid vehicle is an eco-friendly vehicle that can reduce exhaust gases produced and improve fuel efficiency by adopting a motor as well as an engine as power sources. The motor and engine are mounted within a power transfer system that separately transfers engine or motor power to a driving wheel, or transfers both engine and motor power to the driving wheel.

A power transmission system for a hybrid vehicle is configured to include an engine and a motor arranged in series with each other, an engine clutch arranged between the engine and the motor to transmit or cut off engine power, an automatic transmission shifting motor power and motor and engine power to a driving wheel and outputting the power, a hybrid starter generator (HSG) (which is a kind of motor connected with a crank pulley of the engine to transmit power to perform engine start and power generation), an inverter that controls the motor and the power generation, and a high-voltage battery connected with the inverter and chargeable and dischargeable to supply power to the motor.

The power transmission system for a hybrid vehicle of the type in which the motor is attached to the automatic transmission is called a transmission mounted electric device (MTED) scheme. The MTED provides driving modes including an electric vehicle (EV) mode, which is a pure electric vehicle mode using only the motor power, a hybrid electric vehicle (HEV) mode using the motor as sub power while using the engine as main power, a regenerative braking (RB) mode collecting braking and inertial energy of the vehicle using power generation in the motor to charge the battery at the time of braking of the vehicle and when the vehicle drives using intertia.

In the HEV mode, the vehicle is driven by the sum of output torques of the engine and the motor simultaneously with lock-up of the engine clutch. In the EV mode, the vehicle is driven only by an output torque of the motor in conjunction with an opening of the engine clutch.

Meanwhile, operating hydraulic pressure of the engine clutch that determines an operation of the engine clutch for transferring and separating power between the motor and the engine can be determined by the initial hydraulic pressure at which torque transfer starts by contacting both ends (an input end and an output end) of the engine clutch and by feedback hydraulic pressure where hydraulic pressure of the engine clutch is controlled by feeding back an engine speed and a motor speed.

In this case, the hydraulic pressure at which the torque transfer starts by contacting both ends of the engine clutch is referred to as a kisspoint.

In the hybrid vehicle, the transfer torque generated in a lock-up state of the engine clutch by contacting both ends of the engine clutch should be known for more accurate transfer torque calculation. An accurate kisspoint of the engine clutch should be known for transfer torque learning.

The kisspoint of the engine clutch is a primary factor used in state determination of the clutch, calculation of the transfer torque, and calculation of initial fill pressure representing hydraulic pressure at the time when both ends of the clutch contact according to the hydraulic pressure of the clutch and varies by a deviation of a single factor and abrasion of the engine clutch. Accordingly, learning for periodically determining an accurate kisspoint time is required for a correct calculation.

In the existing engine clutch kisspoint learning method, pressure at the time when motor torque (output torque of the motor) is varied by gradually increasing the hydraulic pressure of the engine clutch in an open state while a brake is opened by locating a transmission in a parking stage (P stage) or is turned on by locating the transmission in a neutral stage (N stage) is learned at the kisspoint. The learned kisspoint is used in learning the transfer torque of the engine clutch and calculating the transfer torque.

More specifically, in the existing engine clutch kisspoint learning, the learning starts after forcibly placing a transmission in a neutral state while the brake is turned off by locating the transmission in the parking stage (P stage) or the brake is turned on by locating the transmission in the neutral stage (N stage). The hydraulic pressure at the time when the motor torque is varied, by gradually increasing the hydraulic pressure of the engine clutch while the engine clutch is opened while controlling the engine and the motor at different speeds at the parking stage or the neutral stage, is learned with a new kisspoint (see FIG. 4).

FIG. 4 illustrates that the hydraulic pressure at the time when the motor torque is varied is learned with a new kisspoint in kisspoint learning of the engine clutch in the related art.

However, in the existing engine clutch kisspoint learning method, since an entrance condition for the engine clutch kisspoint learning is a situation in which the brake is turned off by locating the transmission in the parking stage (P stage) or a situation in which the brake is turned on by locating the transmission in the neutral stage (N stage), the learning entrance is impossible while driving. As a result, it is difficult to secure sufficient learning frequencies and opportunities.

Further, as the learning frequency of the engine clutch kisspoint is low, when the vehicle starts immediately after ignition, there is a concern that the kisspoint learning will not be performed within a driving cycle until ignition-off from ignition-on of the vehicle.

The above information disclosed in this background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art and to provide a method for learning a kisspoint of an engine clutch in a hybrid vehicle, which performs kisspoint learning of an engine clutch even while driving by learning hydraulic pressure at the time when motor torque varies by gradually increasing clutch hydraulic pressure in an open state of the engine clutch when a driving load of a vehicle is constant to increase a kisspoint learning frequency of the engine clutch and improve kisspoint accuracy.

In one aspect, the present disclosure provides a method for learning a kisspoint of an engine clutch in a hybrid vehicle, including: determining whether a kisspoint learning entrance condition is satisfied in order to determine whether kisspoint learning of the engine clutch is possible while driving a vehicle; and performing kisspoint detection for kisspoint learning of the engine clutch while driving when it is determined that the kisspoint learning entrance condition is satisfied.

In a preferred embodiment, during determining whether the learning entrance condition is satisfied, it may be determined that the learning entrance condition is satisfied when an engine clutch kisspoint learning history does not exist within a driving cycle until ignition-off after ignition-on of the vehicle, a driving load of the vehicle while driving is constantly maintained, and a battery SOC exists within a predetermined range.

In another preferred embodiment, when it is determined that the kisspoint learning entrance condition is satisfied, a state of the engine clutch may be determined before performing the kisspoint detection and when the engine clutch is in a lock-up state, the lock-up state of the engine clutch is transited to an open state.

In still another preferred embodiment, during performing the kisspoint detection, the motor is controlled at a constant speed to output driver's request torque, the engine is controlled to a speed value acquired by adding up a motor rotational speed and a motor torque variation threshold value, and hydraulic pressure of the engine clutch is gradually increased stepwise to learn hydraulic pressure at the time when torque of the motor which maintains the constant speed varies with the kisspoint of the engine clutch.

In yet another preferred embodiment, the motor rotational speed may be a speed value of the motor controlled to a speed for outputting the driver's request torque and the motor torque variation threshold value may be a speed value capable of causing torque variation of the motor at the time when both ends of the engine clutch contact each other.

According to a method for learning a kisspoint of an engine clutch in a hybrid vehicle according to the present disclosure, a kisspoint learning frequency of an engine clutch and kisspoint accuracy is improved by learning a kisspoint of the engine clutch even while driving, and as a result, transfer torque of the engine clutch is improved and drivability is improved.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
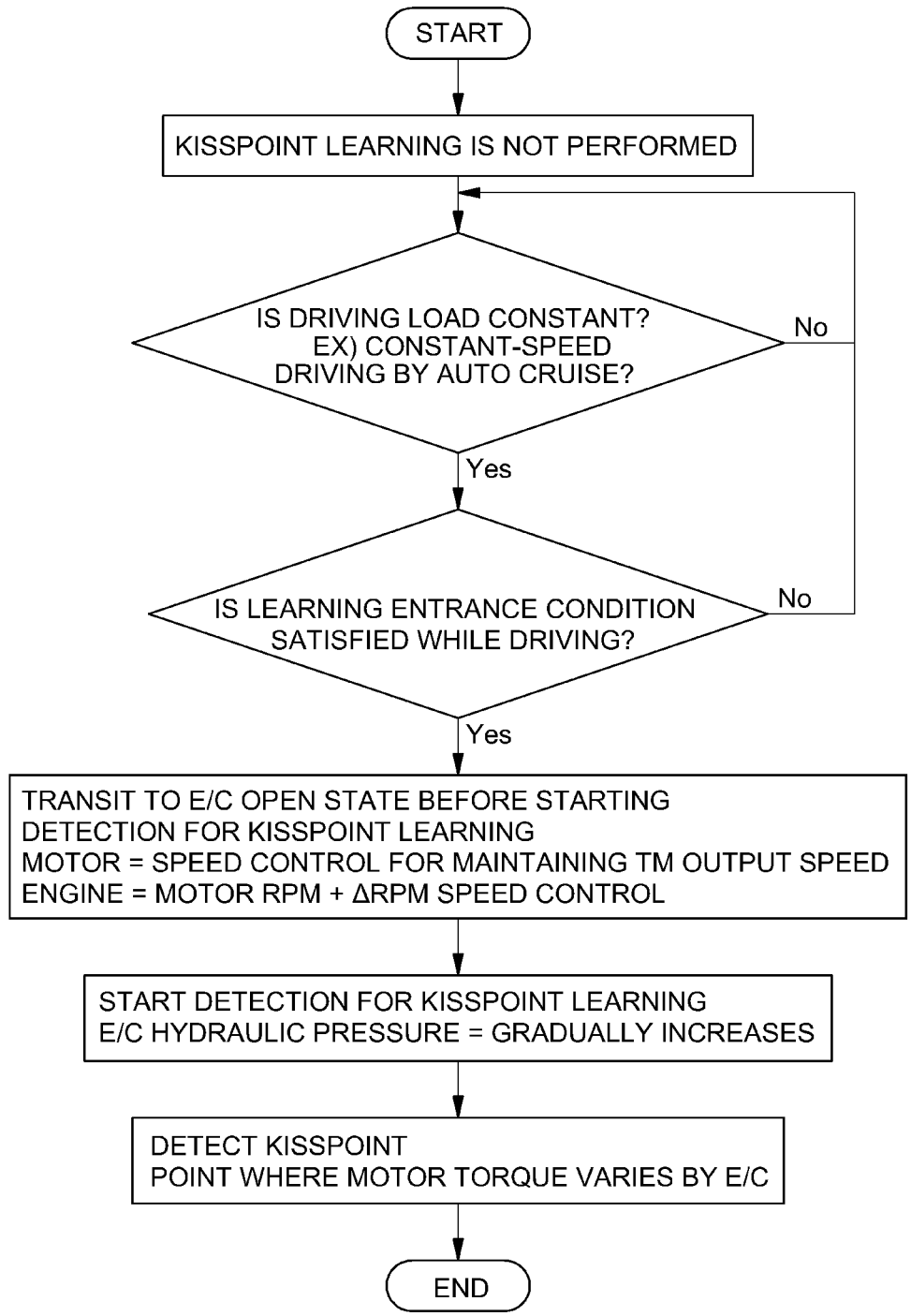
FIG. 1 is a flowchart for describing a method for learning a kisspoint of an engine clutch in a hybrid vehicle according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, reference will now be made in detail to various embodiments of the present disclosure, examples of which are illustrated in the accompanying drawings and described below.

In the present disclosure, kisspoint learning of an engine clutch may be performed while a vehicle stops and the kisspoint learning of the engine clutch may be performed while driving.

However, since technology that performs the kisspoint learning of the engine clutch while the vehicle stops, that is, a transmission is positioned at a parking step (P step) or a neutral step (N step) is known technology, a detailed description thereof will be omitted.

FIG. 1 is a flowchart for describing a method for learning a kisspoint of an engine clutch in a hybrid vehicle according to the present disclosure.

Referring to FIG. 1, it is determined whether a kisspoint learning entrance condition is learned in order to determine whether kisspoint learning of the engine clutch is possible while driving a vehicle.

The learning entrance condition includes a kisspoint learning history, a driving load of the vehicle while driving and a battery status of charge (SOC) while driving.

In order to determining the kisspoint learning entrance condition of the engine clutch while driving, it is determined whether the kisspoint learning point of the engine clutch exists within one driving cycle (until ignition-off from ignition-on of the vehicle). It is further determined whether the driving load is constant while driving when the kisspoint learning history does not exist according to a result of the determination.

When it is determined that the driving load of the vehicle is constant, it is determined whether the battery SOC is within a predetermined range by detecting the battery SOC while driving. This is done to check whether the battery SOC is sufficient, as a vehicular drive force must be provided only by a motor while entering kisspoint learning.

In addition, when it is determined that the driving load of the vehicle is not constant, the kisspoint learning entrance is not performed.

When a driving mode in which the driving load of the vehicle is constant, for example a driving mode in which the vehicle is driven at a constant speed in an auto cruise mode, the kisspoint learning entrance may be performed.

According to a result of determining whether the learning entrance condition is satisfied, it is determined whether the learning entrance condition is satisfied when the engine clutch kisspoint learning history does not exist within one same driving cycle, whether the driving load of the vehicle while driving is constantly maintained and whether the battery SOC exists within the predetermined range.

The predetermined range for determining the battery SOC condition as a reference range for determining whether the battery SOC value satisfies the kisspoint learning entrance condition of the engine clutch is determined to ensure the vehicular drive force only by the motor is sufficient in the kisspoint learning entrance of the engine clutch.

When it is determined that all of the kisspoint learning entrance conditions are satisfied, a current step (gear step) of a transmission is maintained while driving and the kisspoint learning of the engine clutch is entered.

By determining the state of the engine clutch, a kisspoint detection process for the kisspoint learning is performed immediately when the engine clutch is in an open state. When the engine clutch is in a lock-up (or closed) state, the lock-up state of the engine clutch is transited to the open state of the engine clutch and thereafter, the kisspoint detection process for the kisspoint learning is performed. The kisspoint detection process for the kisspoint learning of the engine clutch in the open state of the engine clutch is then performed.

When the kisspoint of the engine clutch is detected, the motor is controlled at a constant speed to output driver's requested torque (torque requested by a driver for driving the vehicle) to maintain a transmission output speed, and the engine is controlled at a speed value acquired by adding a motor rotational speed (motor rpm) and a motor torque variation threshold value ($\Delta$rpm).

The motor rotational speed (motor rpm) is a speed value of the motor controlled at a speed for outputting the driver's output torque. The motor torque variation threshold value, a speed value for enabling the kisspoint of the engine clutch to be detected, is set to a value outside a range that may influence drivability while varying the motor torque at the time of detecting the kisspoint of the engine clutch.

The motor torque variation threshold value ($\Delta$rpm) is determined through testing to cause the motor torque to vary at the time when both ends of the engine clutch contact each other under an actual condition.

Figure 2:
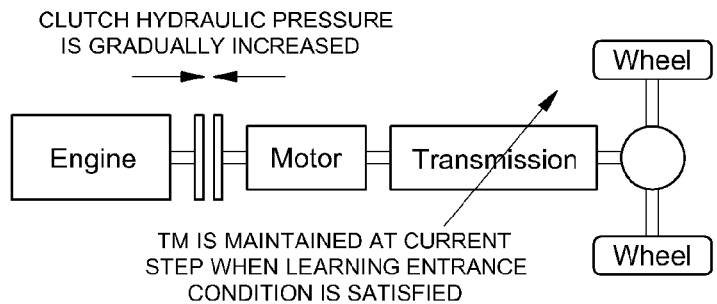
FIG. 2 is a diagram for describing a kisspoint detection condition in learning the kisspoint of the engine clutch according to the present disclosure.

The hydraulic pressure of the engine clutch is then gradually increased (see FIG. 2). The hydraulic pressure of the engine clutch is increased stepwise at predetermined intervals while speed-controlling the motor and the engine to detect hydraulic pressure at the time when the output torque of the motor, which maintains the constant speed, varies and the system learns the hydraulic pressure at that time with a new kisspoint of the engine clutch.

After learning the new kisspoint is completed within one driving cycle, the vehicle returns to a general driving pattern.

After the vehicle returns to the general driving pattern, the engine is output-controlled by an engine operation point while driving, the motor is output-controlled by a motor operation point while driving, the step (gear step) of the transmission is controlled according to a vehicle speed while driving, and the engine clutch is controlled in the open or lock-up state according to the driving mode (HEV mode, EV mode).

Figure 3:
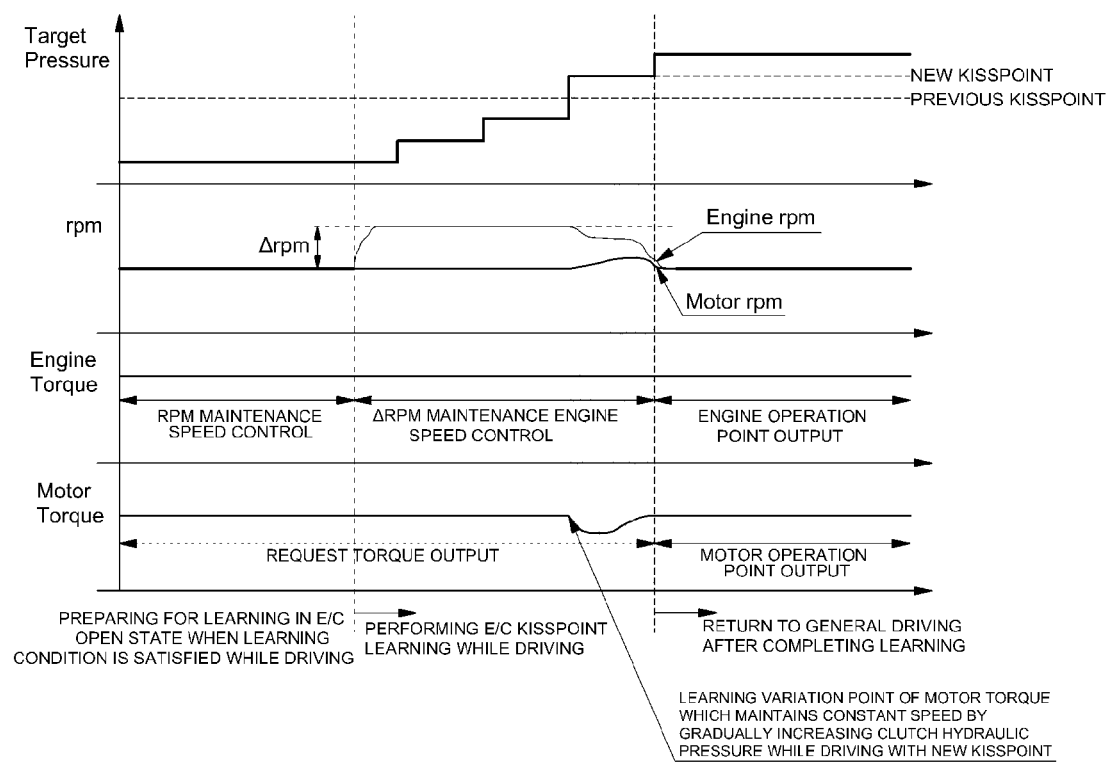
FIG. 3 is a diagram illustrating hydraulic pressure of the engine clutch, and rotational speeds and output torque of an engine and a motor depending on a kisspoint learning process of the engine clutch according to the present disclosure.
Figure 4:
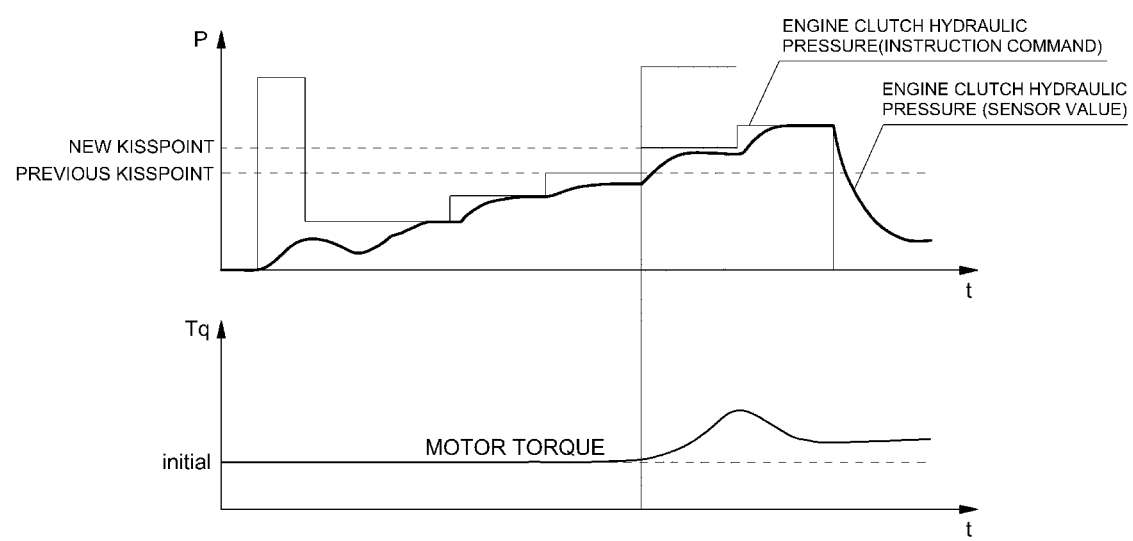
FIG. 4 is a diagram illustrating that hydraulic pressure at the time when the motor torque varies is learned with a new kisspoint at the time of learning the kisspoint of the engine clutch in the related art.

FIG. 3 illustrates the hydraulic pressure of the engine clutch. The rotational speeds and output torque of the engine and the motor depending on a kisspoint learning process of the engine clutch while the hybrid vehicle is being driven illustrates an interval of preparing for the kisspoint learning in the open state of the engine clutch when the kisspoint learning entrance condition is satisfied, an interval of performing the kisspoint detection process for the kisspoint learning of the engine clutch while driving, and an interval of returning to the general diving pattern after completing the kisspoint learning.

The kisspoint learning of the engine clutch may be performed by in-vehicle control units, for example, by a hybrid control unit (HCU), an engine control unit (ECU), a motor control unit (MCU) or a transmission control unit (TCU).

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for learning a kisspoint of an engine clutch in a hybrid vehicle, the method comprising:
    determining whether a kisspoint learning entrance condition is satisfied in order to determine whether kisspoint learning of the engine clutch is possible while driving a vehicle; and
    performing kisspoint detection for the kisspoint learning of the engine clutch while driving when it is determined that the kisspoint learning entrance condition is satisfied,
    wherein when determining whether the kisspoint learning entrance condition is satisfied, it is determined that the kisspoint learning entrance condition is satisfied when a kisspoint learning history of the engine clutch does not exist within a driving cycle of ignition-off after ignition-on of the vehicle, a driving load of the vehicle while driving is constantly maintained, and a battery SOC exists within a predetermined range.

2. The method of claim 1, wherein when it is determined that the kisspoint learning entrance condition is satisfied, a state of the engine clutch is determined before performing the kisspoint detection, and when the engine clutch is in a lock-up state, the lock-up state of the engine clutch is transited to an open state.

3. The method of claim 1, wherein during performing the kisspoint detection, a motor is controlled at a constant speed to output a driver's request torque, the engine is controlled to a speed value acquired by combining a motor rotational speed and a motor torque variation threshold value, and a hydraulic pressure of the engine clutch is gradually increased stepwise to learn hydraulic pressure when torque of the motor, which maintains the constant speed, varies at a kisspoint of the engine clutch.

4. The method of claim 3, wherein the motor rotational speed is the speed value of the motor controlled to a speed for outputting the driver's request torque and the motor torque variation threshold value is the speed value capable of causing torque variation of the motor at the time when both ends of the engine clutch contact each other.

5. The method of claim 1, wherein the predetermined range for determining the battery SOC as a reference range for determining whether the battery SOC satisfies the kisspoint learning entrance condition of the engine clutch is determined to ensure that a vehicular drive force only by the motor is sufficient in entering the kisspoint learning of the engine clutch.

6. The method of claim 1, wherein, when it is determined that all of the kisspoint learning entrance conditions are satisfied, a gear step of a transmission is maintained while driving and the kisspoint learning of the engine clutch is entered.

* * * * *